(12) United States Patent
Tauber et al.

(10) Patent No.: US 9,328,842 B2
(45) Date of Patent: May 3, 2016

(54) HYDRAULIC ACTUATING ASSEMBLY

(75) Inventors: Richard Tauber, Heigenbruecken (DE); Udo Froehlich, Rothenfels (DE)

(73) Assignee: Robert Bosch GmbH, Stuttgart (DE)

( * ) Notice: Subject to any disclaimer, the term of this patent is extended or adjusted under 35 U.S.C. 154(b) by 465 days.

(21) Appl. No.: 13/983,364

(22) PCT Filed: Jan. 27, 2012

(86) PCT No.: PCT/EP2012/000382
§ 371 (c)(1),
(2), (4) Date: Nov. 20, 2013

(87) PCT Pub. No.: WO2012/104046
PCT Pub. Date: Aug. 9, 2012

(65) Prior Publication Data
US 2014/0060684 A1    Mar. 6, 2014

(30) Foreign Application Priority Data

Feb. 4, 2011 (DE) .......................... 10 2011 010 428
Feb. 25, 2011 (DE) .......................... 10 2011 012 304
Jun. 18, 2011 (DE) .......................... 10 2011 104 530

(51) Int. Cl.
| | |
|---|---|
| F16K 31/12 | (2006.01) |
| F15B 20/00 | (2006.01) |
| F16K 31/122 | (2006.01) |
| F16K 31/56 | (2006.01) |
| F15B 19/00 | (2006.01) |

(52) U.S. Cl.
CPC ............... *F16K 31/12* (2013.01); *F15B 19/005* (2013.01); *F15B 20/008* (2013.01); *F16K 31/1225* (2013.01); *F16K 31/56* (2013.01); *Y10T 137/87917* (2015.04)

(58) Field of Classification Search
CPC ..... F16K 31/12; F16K 31/1225; F16K 31/56; F15B 19/005; F15B 20/008; Y10T 137/87917
USPC ................. 137/613, 601.13, 601.14, 596.14, 137/596.16; 251/25, 29, 69; 91/447, 444, 91/446, 452, 461
See application file for complete search history.

(56) References Cited

U.S. PATENT DOCUMENTS

| | | | |
|---|---|---|---|
| 5,143,119 A * | 9/1992 | Plangger | F01D 17/26 137/557 |
| 5,217,199 A | 6/1993 | Frey | |
| 5,280,807 A | 1/1994 | Frey et al. | |
| 7,444,920 B2 * | 11/2008 | Herrmann | F15B 11/042 91/433 |
| 7,699,073 B2 * | 4/2010 | Decker | F15B 11/068 137/599.08 |

FOREIGN PATENT DOCUMENTS

| | | |
|---|---|---|
| DE | 101 52 414 A1 | 5/2003 |
| DE | 10 2009 021 668 A1 | 11/2010 |
| DE | 10 2010 011 516 A1 | 9/2011 |
| EP | 1 413 810 A1 | 4/2004 |
| EP | 1 757 817 A2 | 2/2007 |

OTHER PUBLICATIONS

International Search Report corresponding to PCT Application No. PCT/EP2012/000382, mailed May 7, 2012 (German and English language document) (5 pages).

* cited by examiner

*Primary Examiner* — John K Fristoe, Jr.
*Assistant Examiner* — Andrew J Rost
(74) *Attorney, Agent, or Firm* — Maginot, Moore & Beck LLP

(57) ABSTRACT

A hydraulic actuating assembly for valves for controlling process fluid flows includes a valve that is operated by an actuator and that is pre-tensioned in the direction of a closing position. The actuator has a pressure chamber which is active in the opening direction and which can be connected to a low pressure by means of three parallel relief paths. A secondary relief path, which can be activated in a test mode, is provided.

14 Claims, 6 Drawing Sheets

HYDRAULIC ACTUATING ASSEMBLY

This application is a 35 U.S.C. §371 National Stage Application of PCT/EP2012/000382, filed on Jan. 27, 2012, which claims the benefit of priority to Serial No. DE 10 2011 010 428.3, filed on Feb. 4, 2011 in Germany, Serial No. DE 10 1011 012 304.0, filed on Feb. 25, 2011 in Germany, and Serial No. DE 10 2011 104 530.2, filed on Jun. 18, 2011 in Germany, the disclosures of which are incorporated herein by reference in their entirety.

The disclosure relates to a hydraulic actuating assembly for fittings for controlling process fluid flows.

BACKGROUND

EP 1 413 810 A1 discloses an actuating assembly of the generic type for a turbine valve for controlling the gas or steam supply of a turbine or for a process fitting for controlling a process flow in process engineering. Actuating assemblies of this type usually have an actuating drive which is configured as an electric spindle drive in the subject matter of EP 1 413 810 A1. In a gas turbine, an opening cross section of a fitting can be adjusted, for example, by means of an actuating assembly of this type in order to set a gas supply. In an emergency, for example in the event of a power failure or a disruption, the fitting is to be reset automatically, in order to avoid damage to the plant. To this end, the spindle drive in the known solution is assigned a toggle lever mechanism which is locked in a stretched position during regular operation, that is to say with a sufficient power supply, in which stretched position a prestressing spring is stressed. In the event of a power failure, the locking mechanism releases the toggle lever, with the result that it is adjusted via the prestressing spring from its stretched position into its bent position and, in accordance with this adjustment path, the fitting is adjusted back into its predefined basic position, as a rule the closed position.

A toggle lever mechanism of this type requires considerable outlay in terms of device technology and also takes up a relatively large amount of installation space.

In order to eliminate this disadvantage, DE 10 2009 021 668 A1 by the applicant discloses an actuating assembly, in which a fitting is actuated via a regulating drive and a switching fitting which is arranged in series with respect to the former is actuated via a switching drive. The regulating drive is configured with an emergency actuating means which closes the fitting in the case of a power failure. In contrast to the above-described embodiment, said emergency actuating means is not configured by way of a toggle lever mechanism, but rather by way of a spring which acts on the fitting in the closing direction and which is prestressed hydraulically. In the case of emergency actuation, said prestressing pressure is relieved in the direction of low pressure, with the result that the spring closes the regulating fitting in a controlled manner. In a corresponding way, the switching fitting is also closed in the case of a power failure, with the result that damage to the turbine or the process engineering plant is virtually ruled out. In the subject matter of DE 10 2009 021 668 A1, an electrically actuable fitting valve is arranged in a relief path to the low pressure, which fitting valve is prestressed in the direction of its open position via a spring and can be switched over electrically into a position, in which the relief path is shut off. In the case of a power failure, said relief path is then opened correspondingly, with the result that the spring can be relieved.

One requirement of hydraulic actuating assemblies of this type consists in that the emergency functional capability of the actuating assembly is to be tested during operation and as far as possible without impairment of the operation. It is to be determined here whether the emergency actuating means is intact and, in the case of a power failure, can close the process fitting and/or the switching drive.

In the case of a regulating drive, this test is possible with comparatively low outlay, since the emergency functional capability in the sense of a partial lift test can be interrogated by way of suitable actuation of the regulating drive. A partial lift test of this type cannot be realized by way of conventional actuating assemblies in a switching fitting, since the latter can be switched over via the switching drive merely between the open position and the closed position. The test can then not take place during operation of the turbine or the process engineering plant.

SUMMARY

In contrast, the disclosure is based on the object of providing a hydraulic actuating assembly, in which the emergency functional capability can be tested with low outlay.

This object is achieved by way of a hydraulic actuating assembly having the features disclosed herein.

According to the disclosure, the hydraulic actuating assembly for fittings for controlling process fluid flows, for example steam or gas flows of a turbine, has an actuator, for example a switching drive of a switching fitting or a cylinder of a regulating drive, which is prestressed in the direction of a closed position via an energy store. The actuator has a pressure space which acts in the opening direction of the switching fitting, is loaded via a main line with an opening pressure counter to the direction of action of the energy store, and can be connected to low pressure via at least three parallel relief paths. An upstream and downstream relief valve are arranged in a series connection in each of the relief paths, it being possible for said relief valves to be adjusted in each case from a shut position into a relief position in order to close the actuator. According to the disclosure, in addition to said relief paths, an auxiliary relief path is configured which extends between output connectors of the upstream or downstream relief valves, in each case at least one nozzle with a small opening cross section preferably being arranged in an auxiliary relief path section between two adjacent relief valves. An actuating circuit is configured in such a way that an upstream relief valve in one relief path and a downstream relief valve in another relief path can be adjusted into a relief position in order to carry out a partial lift test.

Both the function of a switching drive and the function of a regulating drive, for example an energy cylinder, can be tested by way of a solution of this type.

By way of the actuation of two relief valves in different relief paths, none of the actual relief paths is opened in a controlled manner, but rather merely the auxiliary relief path is active, the pressure medium volumetric flow from the switching pressure space of the switching fitting in the direction of low pressure being restricted, however, by the small cross section of the at least one nozzle, with the result that merely a small pressure medium volumetric flow flows out, which leads to a comparatively minor but measurable closing movement of the actuator. Said closing movement is detected, in order to establish the functional capability.

An auxiliary relief path of this type therefore makes it possible in a simple way to detect the functional capability of the actuator in a test mode, the pressure in the main line sinking only slightly.

In one preferred exemplary embodiment of the disclosure, at least two nozzles are connected behind one another in each auxiliary relief path section between two adjacent relief valves. In this way, the nozzles can still be configured with a sufficient cross section which is firstly so great that it is not clogged and secondly makes a sufficient pressure drop with a correspondingly low pressure medium flow possible as a result of the series connection of two nozzles.

In one exemplary embodiment of the hydraulic actuating assembly, it is possible for one upstream relief valve in one relief path and one downstream relief valve in another relief path to be connected to the low pressure via a common relief control valve, in order to switch over the respective relief valve from its shut position into its passage position.

As has already been mentioned, the actuator can be, for example, a switching drive of a switching fitting or else a regulating drive of a regulating fitting.

According to the disclosure, it is preferred if a regulating fitting is arranged in series with the switching fitting, which regulating fitting can be adjusted proportionally via a regulating drive, the regulating fitting being configured with an emergency actuating means, via which the regulating fitting can be reset into a basic position, preferably a closed position, in the case of a fault. It is possible for said emergency actuating means to be triggered by switching of an electrically actuated fitting valve. In one exemplary embodiment, said emergency actuating means can also be triggered independently of the fitting valve via an emergency function valve which can be switched over by a control pressure.

Said control pressure can be tapped off via a control line at the switching drive.

In one particularly preferred exemplary embodiment, the control line connects a control space of the emergency function valve to a main line of the switching drive, a control switchover valve being arranged in the control line, which control switchover valve is prestressed in the direction of a throughflow position and can be switched over in the direction of a leak-free shut position.

In one exemplary embodiment of the hydraulic actuating assembly, the actuator is a cylinder, for example an energy cylinder of a regulating drive or part of a coupling device of an emergency actuating means, the coupling device being connected operatively to an electric, electrohydraulic or hydraulic drive.

In one exemplary embodiment, logic valves are used for the relief valves and/or the emergency function valve.

The energy store for prestressing the switching drive is preferably configured as a switching spring.

The actuating circuit of the actuating assembly can be configured with a proportional valve, via which the pressure in the pressure space can be set. Said proportional valve can be prestressed hydraulically into a basic position, in which the pressure space is connected to low pressure.

In one exemplary embodiment, the cylinder of the regulating drive is position-controlled.

The actuating assembly can be of particularly compact configuration if the relief valves in one relief path, what is known as a main relief path, have a greater nominal size than those in the other relief paths. It is accepted here that, if smaller nominal sizes are used, a slight delay in the closing time of the respective relief valves having a smaller nominal size can occur.

In the case in which the actuating assembly is used for actuating a regulating drive, the cylinder which is configured with the pressure space can be part of a coupling device of an emergency actuating means which is connected operatively to a drive. The latter is configured as an electrohydraulic drive in one specifically described solution.

BRIEF DESCRIPTION OF THE DRAWINGS

In the following text, one preferred exemplary embodiment of the disclosure will be explained in greater detail using diagrammatic drawings, in which.

DETAILED DESCRIPTION

In the following text, the disclosure will first of all be explained using one exemplary embodiment, in which the actuating assembly according to the disclosure is used for setting a steam volumetric flow of a steam turbine. In principle, however, the actuating assembly according to the disclosure can be used generally in fittings for controlling process fluids, in pipelines, in chemical plants, in pressure modifying or distributing stations or, viewed more generally, in devices, in which a resetting operation into a predefined active position has to take place in the case of a fault for safety reasons, stored energy then being used for the restoring operation. These can be linear or rotational movements.

Figure 1:
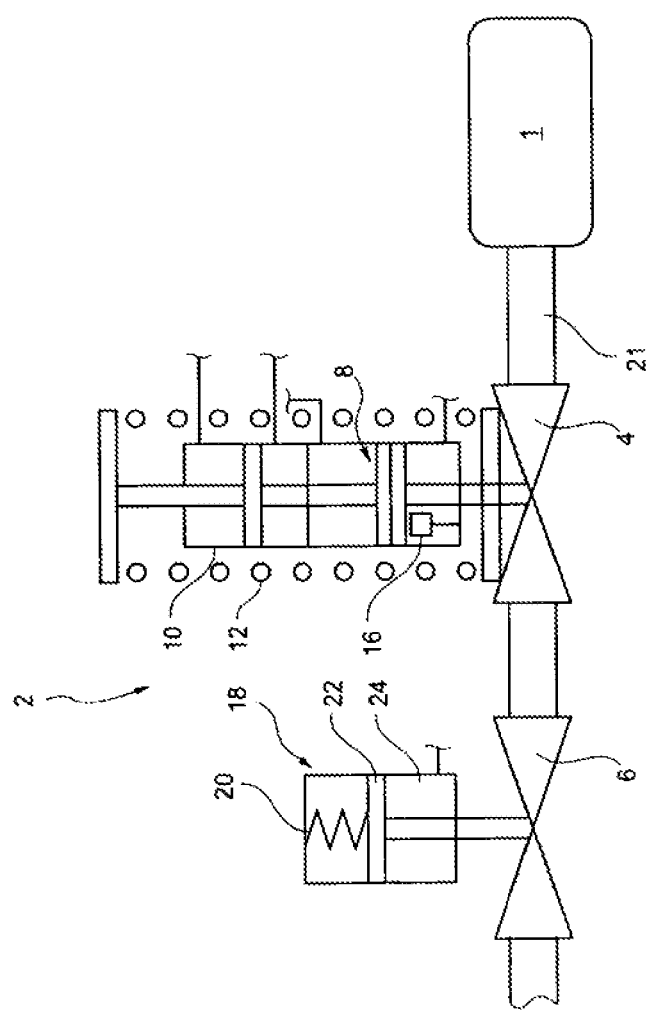
FIG. 1 shows a greatly simplified circuit diagram of an actuating assembly according to the disclosure having a regulating fitting and a switching fitting.

FIG. 1 shows a greatly simplified circuit diagram of a steam turbine 1, the steam volumetric flow of which can be set via an actuating assembly 2 according to the disclosure having a regulating fitting 4 and a switching fitting 6. The regulating fitting 4 is actuated via a regulating drive 8, via which the opening cross section of the regulating fitting can be adjusted proportionally, in order to regulate the steam supply to the steam turbine 1. The regulating drive 8 consists essentially of an actuating cylinder 10, via which a valve body of the regulating fitting 4 can be adjusted. In the case of a fault, for example a power failure, the regulating fitting 4 cannot be reset directly via the actuating cylinder 10, since the latter is supplied with pressure medium via electrically switched valves which will be explained in greater detail in the following text and an electrically operated pump. In the actuating drive according to the disclosure, this restoring operation takes place via an emergency actuating means 12 which consists essentially of a spring-force accumulator which is prestressed hydraulically via the actuating cylinder 10. In the case of a power failure, the spring-force accumulator of the emergency actuating means 12 is unlocked, with the result that the regulating fitting 4 is moved back into its closed position. In order to avoid excessive acceleration of the regulating fitting 4 in the end position, it is assigned a damping device 16, via which the movement of the fitting is damped in the region of the end position.

The switching fitting 6 is adjusted by means of a switching drive 18. The latter is held in its open position during regular operation of the steam turbine; in the case of a power failure, the switching fitting 6 is moved via the switching drive 18 into the closed position, with the result that the steam supply via the steam line 21 is shut off. As a result, the steam supply via the steam line 21 is shut off by way of two devices which act independently of one another. In the exemplary embodiment which is described, the switching drive 18 consists essentially of a spring-force accumulator 20 which is prestressed via a piston 22. The latter is for its part loaded in the prestressing direction by the pressure in a pressure space 24. In the case of a fault, said pressure space 24 is connected to low pressure, with the result that the switching fitting 6 is adjusted from its open position into the shut position by way of the force of the spring-force accumulator 20.

Figure 2:
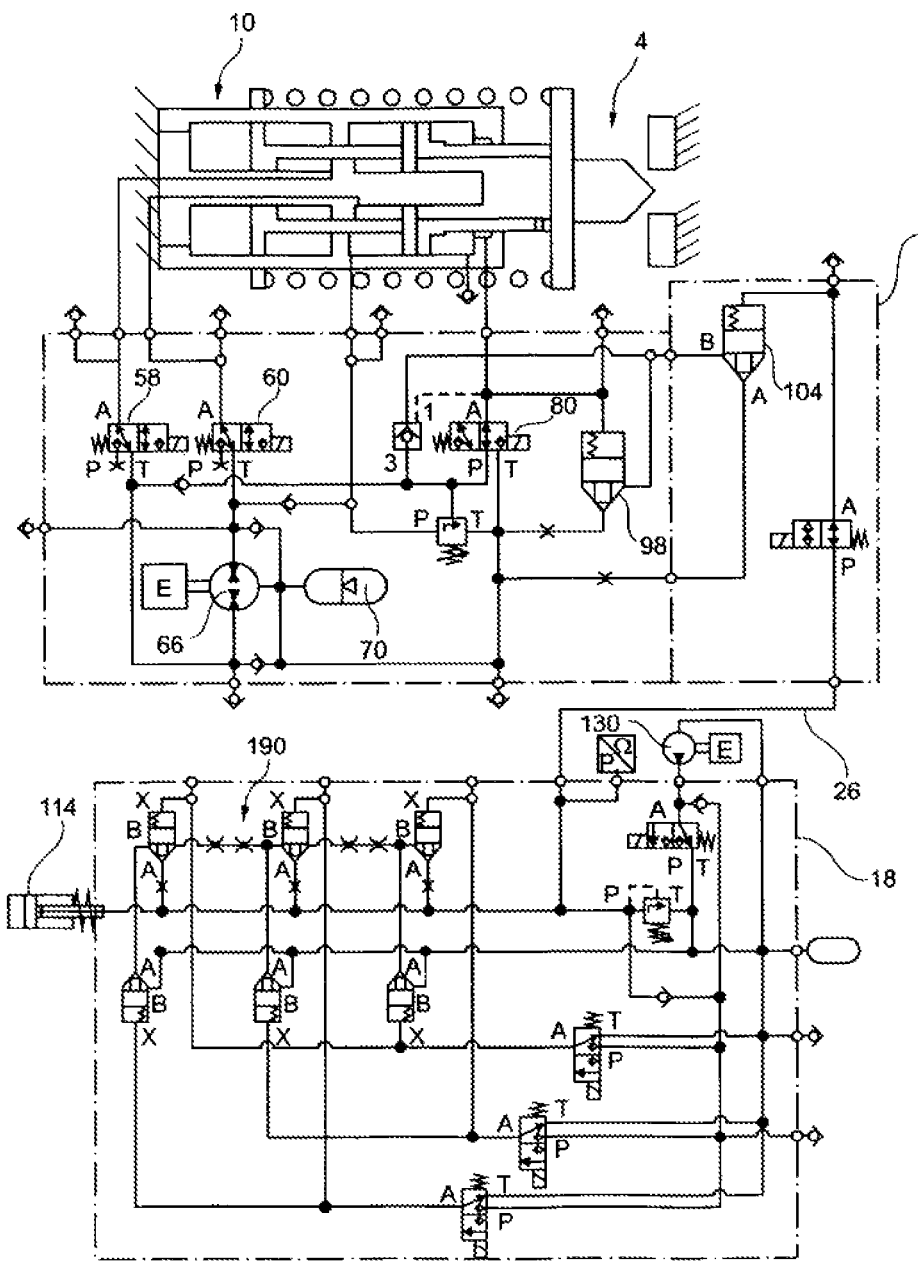
FIG. 2 shows a circuit diagram of one specific solution of a hydraulic actuating assembly of an industrial steam turbine.

FIG. 2 shows the detailed circuit diagram of an actuating assembly of this type having the regulating fitting 4 which is actuated by the regulating drive 8 and the switching fitting (not shown) which is arranged in series with respect to the former and is actuated by the switching drive 18.

The regulating drive 8 and the switching drive 18 are connected via a control line 26, the function of which will be explained in greater detail in the following text.

Figure 3:
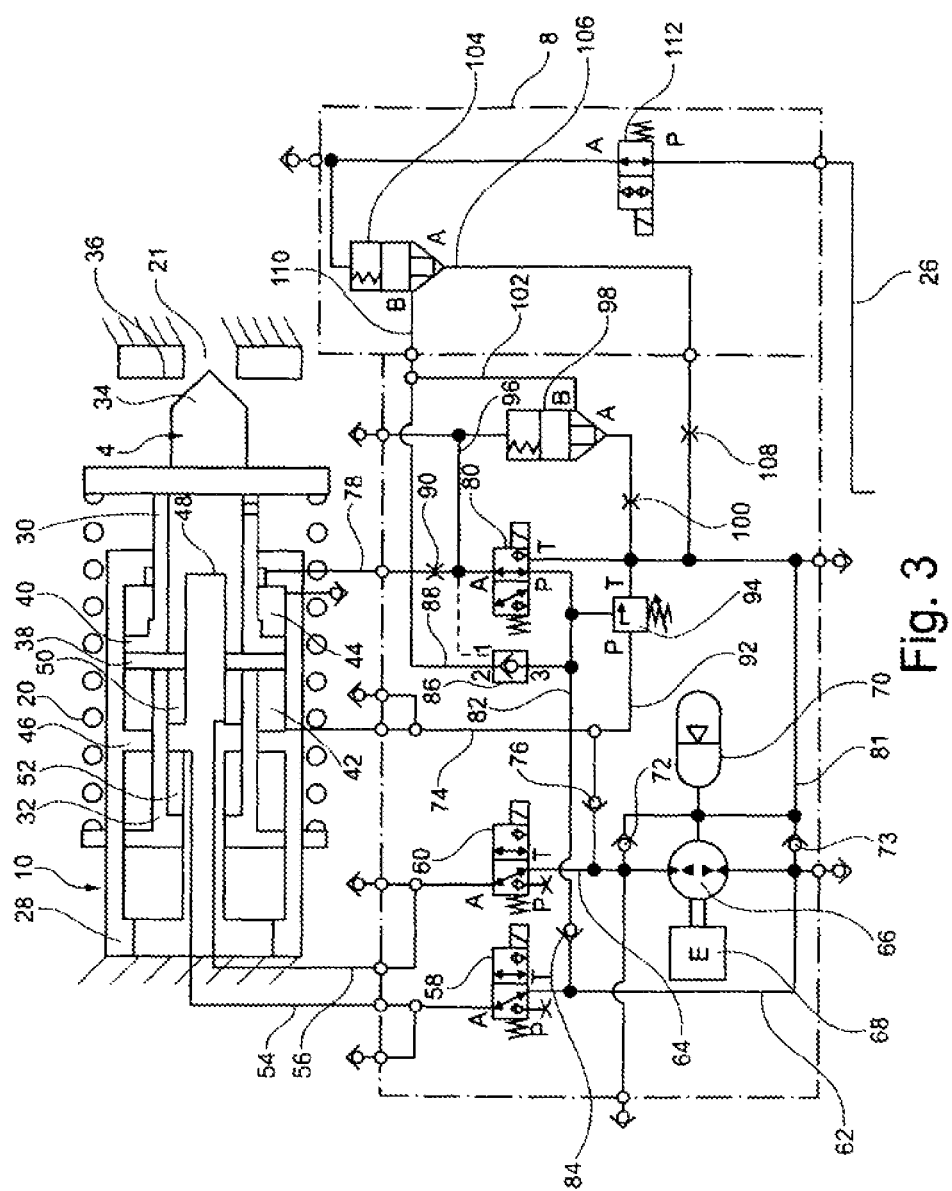
FIG. 3 shows an individual illustration of a regulating drive of the actuating drive according to FIG. 2.

FIG. 3 shows the regulating drive 8 for the regulating fitting 4 in an individual illustration.

The basic principle and the individual functions of the regulating drive 8 are disclosed in subsequently published patent application DE 10 2010 011 516.9, with the result that only the structural elements and functions which are necessary to understand the function of the regulating drive 8 will be described in the following text and reference is made otherwise to the disclosure of the above-mentioned patent application. The applicant reserves the right to transfer individual passages of said document in an adapted manner to the present patent application, should this be necessary in order to improve the understanding.

The actuating cylinder 10 of the regulating drive 8 has a cylinder 28 which is arranged in a stationary manner and in which a fitting piston 30 and a stressing piston 32 are accommodated. At its end section which projects out of the cylinder 28, the fitting piston 30 carries a valve body 34 of the regulating fitting 4, which valve body 34 is adjusted in the direction of a seat 36 for closing.

Both pistons 30, 32 in each case have a flange, on which a spring of the spring-force accumulator 20 is supported. When the two pistons 30, 32 bear against one another with their piston collars 38, 40 as shown in FIG. 3, the spring-force accumulator 20 is at maximum prestress. Together with a cylinder intermediate floor, the two piston collars 38, 40 delimit two pressure spaces 42, 44 which are configured substantially with identical end faces.

The stressing piston 32 is configured as a hollow piston and, with a cylinder journal 48 and the intermediate floor 46, delimits two stressing spaces 50, 52 which are configured with a smaller cross-sectional area than the two other pressure spaces 42, 44 and which are connected in each case via stressing lines 54, 56 to work connectors A of an actuating valve 58, 60. Both actuating valves 58, 60 are configured as electrically actuable 2/2-way seat valves and are prestressed via a spring into the basic position which is shown, in which the stressing line 54 is connected to a pressure line 62 and the stressing line 56 is connected to an inlet line 64. The pressure line 62 is connected to a connector of a hydraulic machine 66 and the inlet line 64 is connected to the other connector of the hydraulic machine 66, with the result that a closed circuit is formed, via which the opening cross section of the regulating fittings can be set by way of adjustment of the stressing piston 32 via the hydraulic machine 66. The hydraulic machine 66 can be operated as a pump or a hydraulic motor and is of reversible-rotation configuration and is driven via a drive, for example an electric motor 68.

The pressure line 62 and the inlet line 64 are connected to a low pressure accumulator 70 in each case via a replenishing valve 73, 72 which opens in the direction of the pressure line 62 and the inlet line 64, respectively, for replenishing pressure medium. A pressure line 74 which opens into the pressure space 42 branches off from the inlet line 64. A nonreturn valve 76 which shuts in the direction of the inlet line 64 is arranged in said pressure line 74.

The other pressure space 44 is connected via a relief line 78 to the work connector of a fitting valve 80. In the exemplary embodiment which is shown, this is configured as a 3/2-way seat valve and is prestressed via an electromagnet into a switching position which is shown, in which the relief line 78 is connected to a channel 82 which is connected at one end to a pressure connector P of the fitting valve 80 and opens at the other end into the pressure line 62, a back flow from the channel 82 to the pressure line 62 being prevented, however, by way of a further replenishing valve 84. The channel 82 is also in a pressure medium connection with the pressure line 74, with the result that the two pressure spaces 42, 44 are connected to one another in the switching position which is shown of the fitting valve 80. An unlockable nonreturn valve 86 is configured parallel to the fitting valve 80, which nonreturn valve 86 is arranged in a bypass channel 88 which opens at one end into the relief line 78 and at the other end into the channel 82. The shut-off valve can be unlocked by the pressure downstream of a nozzle 90 (as viewed in the relief direction) in the relief line 78.

In the switching position which is shown, a tank connector T of the fitting valve 80 is connected to an accumulator channel 81 which opens between the replenishing valves 72, 73 into the line section which is connected to the low-pressure accumulator 70. A pressure limiting channel 92 branches off from the pressure line 74, in which pressure limiting channel 92 a pressure limiting valve 94 is arranged which is loaded in the opening direction by the pressure in the channel 82 and, if a maximum pressure in the channel 82 is exceeded, opens a pressure medium connection to the accumulator channel 81 in a controlled manner.

If the fitting valve 80 is deenergized, it is prestressed by way of the force of a spring into a basic position, in which the pressure connector P is shut and the working connector A is connected to the accumulator channel 81; accordingly, the pressure space 44 is then relieved toward low pressure via the nozzle 90.

Downstream (in the relief direction) of the nozzle 90, a control channel 96 branches off from the relief line 78, which control channel 96 opens into the control space of a bypass valve 98 which is configured as a logic valve, with the result that said valve is prestressed in the closing direction by the pressure in the relief line 78. An end-side connector A of the bypass valve 98 is connected via a further nozzle 100 to the accumulator channel 81, and a radial connector B of the bypass valve 98 is connected via a further control channel 102 upstream of the nozzle 90 to the relief line 78. As will still be explained in greater detail in the following text, the pressure medium flows out of the pressure space 44 in the spring-prestressed basic position of the fitting valve 80, with the result that a pressure difference is produced across the nozzle 90, which pressure difference acts on the bypass valve 98 in the opening direction, with the result that said bypass valve 98 is opened counter to the force of a prestressing spring and a parallel relief flow path via the two control channels 102, 100 is therefore opened in a controlled manner, said relief flow path not leading via the nozzle 90, with the result that the closing movement takes place more quickly than in the case of an outflow via the nozzle 90. Up to this point, the construction of the regulating drive 8 corresponds substantially to that which is described in the abovementioned, subsequently published patent application.

One special feature of the regulating drive according to FIG. 3 consists in the fact that an emergency function valve 104 is provided parallel to the fitting valve 80, which emergency function valve 104 is likewise configured as a logic valve and is prestressed via a weak spring into its basic position which is shown, in which a connector A is shut off with respect to a radial connector B. The connector A is connected via a low-pressure channel 106 and a nozzle 108 to the accumulator channel. The radial connector B of the emergency function valve 104 is connected via a line 110 and the control channel 102 upstream (relief direction) of the nozzle 90 to the relief line 78. A control space which acts in the closing direction is connected to the abovementioned control line 26, in which a control switchover valve 112 which is configured as a 2/2-way seat valve is arranged which is prestressed via a spring into the basic position which is shown, in which the pressure medium connection of the control space of the emergency function valve 104 to the control line 26 is opened in a controlled manner. The control switchover valve 112 can be switched over electrically into a locked position, in which the control line 26 is shut off in a leak-free manner with respect to the emergency function valve 104.

The pressure loading of the abovementioned pressure spaces of the actuating cylinder 10 can take place in principle as described in the abovementioned patent application, via the hydraulic machine 66 by way of multiple circulation and intake of pressure medium from the low-pressure accumulator 70. The stressing of the spring-force accumulator 20 takes place via the hydraulic machine 66, pressure medium being conveyed into the stressing space 50. In order to adjust the valve body 34, pressure medium is conveyed into the stressing space and is expelled out of the other stressing space 52. Here, the fitting valve 80 is switched over electrically into its switching position which is shown, with the result that pressure medium is expelled out of the pressure space 44 which is reducing in size into the pressure space 42 which is increasing in size correspondingly.

In the case of a fault, for example a power failure, said valves are deenergized, with the result that the fitting valve 80 is switched over into its spring-prestressed position, in which the connectors A and T are connected to one another. The pressure medium then flows out of the pressure space 44 toward the low-pressure accumulator 70, the movement of the fitting piston 30 being assisted by the force of the spring-force accumulator 20. During this relief operation, pressure medium flows via the nozzle 90, with the result that the above-described pressure difference opens the bypass valve 98 and the further relief flow path to the low-pressure accumulator 70 is opened in a controlled manner. After a predefined path, the valve body 34 rests on the seat 36, with the result that the steam line 21 is shut off. In the case of a power failure, the control switchover valve 112 is also switched over into its passage position, with the result that the control line 26 to the control space of the emergency function valve 104 is open. If, as will be explained in greater detail in the following text, there is low pressure in the control line 26, the emergency function valve 104 is opened correspondingly by way of the pressure which acts in the opening direction downstream of the nozzle 90, with the result that a further relief flow path via the line 110 and the low-pressure channel 106 is opened in a controlled manner.

The construction of the switching drive will be explained in the following text using FIG. 4.

The switching drive 18 has a switching cylinder 114, the switching housing 116 of which actuates a valve body (not shown) of the switching fitting. The stationary switching piston 22 of the switching cylinder 114 is loaded via a switching spring 118 in the direction of a closed position of the switching fitting. The switching housing 116 delimits a switching pressure space 120 which loads the switching housing 116 in the direction of opening of the switching fitting 6 and therefore acts counter to the spring force. If the switching pressure space 120 is relieved of pressure, the spring 118 therefore becomes active and closes the switching fitting 6, with the result that the steam line 21 is shut off.

A main line 122 opens into the switching pressure space 120, which main line 122 opens at the other end into a supply line 124, a nonreturn valve 126 being provided in the main line 122, which nonreturn valve 126 permits a flow of pressure medium in the direction of the switching cylinder 114 and blocks a flow of pressure medium from the latter in the direction of the supply line 124. The supply line is connected via a further nonreturn valve 128 which is arranged in the same direction to the pressure connector of a switching pump 130 which is actuated, for example, electrically and the suction connection of which is connected via a suction line 132 to a switching low-pressure accumulator 134. The supply line 124 branches off to a connector A of a low-pressure valve 136 which, in a spring-prestressed basic position (FIG. 4), connects the working connector A to a tank connector T which for its part is connected to a tank line 138. The pressure in the supply line 122 is limited via a pressure limiting valve 140 which, if a preset maximum pressure is exceeded, opens a pressure medium connection to the tank line 138 in a controlled manner. The low-pressure valve 136 can be adjusted electrically into a switching position, in which the pressure medium connection to the tank line 138 is shut off. In the exemplary embodiment which is shown, the low-pressure valve 136 is configured as a directional seat valve.

Figure 4:
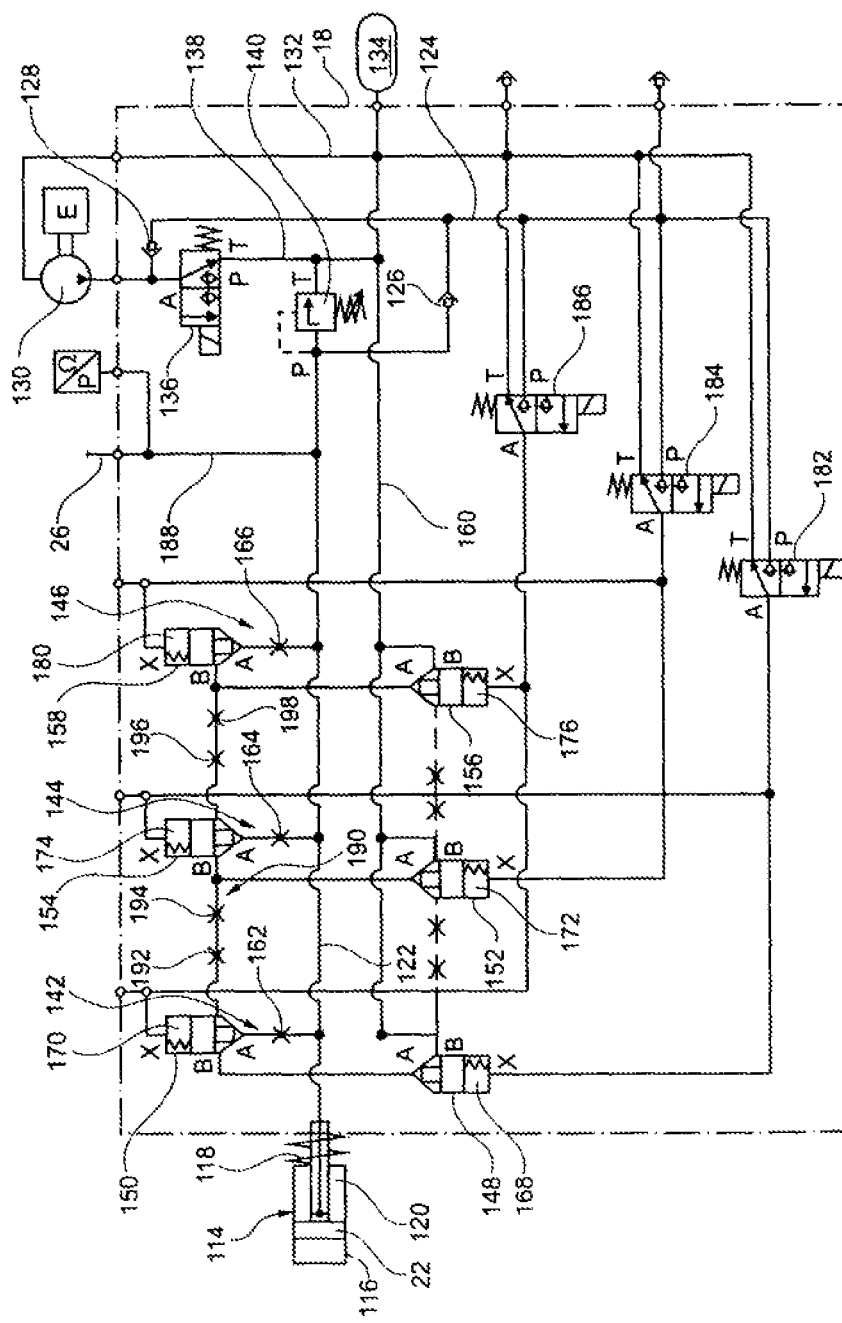
FIG. 4 shows an individual illustration of a switching drive of the electric actuating drive according to FIG. 2.

One special feature of the circuit according to FIG. 4 consists in the fact that the pressure space 120 can be connected via a total of three relief paths 142, 144, 146 to the switching low-pressure accumulator 134, in order to close the switching fitting 6. Two relief valves 148, 150, 152, 154, 156, 158 which are connected in series are arranged in each of the relief paths 142, 144, 146, via which relief valves 148, 150, 152, 154, 156, 158 a pressure medium connection from the main line 122 and the respective relief path 142, 144, 146 to an outlet line 160 which is connected to the switching low-pressure accumulator 134 can be opened in a controlled manner, which outlet line 160 is connected to the suction line 132. Each of the relief valves 148 to 158 is configured as a logic valve. The three relief valves 150, 154, 158 are connected with their connectors A via in each case one orifice plate 162, 164, 166 to the main line 122. Radial connectors B of said relief valves 150, 154, 158 are connected to the connectors A of the associated relief valves 148, 152 and 156, respectively. The radial connectors B thereof are then for their part connected to the outlet line 160. The relief valves 148 to 158 are prestressed via a comparatively weak spring in the direction of their closed position. A control pressure in a control space 168, 170, 172, 174, 176, 180 acts in the same direction. The control pressure in said control spaces 168 to 180 is defined via relief control valves 182, 184 and 186 which are assigned in each case to a relief path 142, 144 and 146, respectively. Said relief control valves 182, 184, 186 are configured in each case as 3/2-way seat valves and are prestressed via a spring into a basic position, in which in each case one control connector A is connected to a tank connector T which for its part is in a pressure medium connection with the switching low-pressure accumulator 134. Each of the relief control valves 182, 184, 186 can be switched over electrically into a position, in which the connector A is connected to a pressure connector P which for its part is in a pressure medium connection with the supply line 124 and therefore with the pressure connector of the switching pump 130. The working connector A of the relief control valve 182 is connected via control lines to the control spaces 168 and 174. The control connector A of the relief control valve 184 is connected via a control line to the control spaces 172 and 180, and the control connector A of the third relief control valve 186 is then connected correspondingly to the remaining control spaces 170 and 176. In other words, control spaces of relief valves which are situated in different relief paths are loaded with low pressure or high pressure (pump pressure) via in each case one relief control valve 182, 184, 186. In this way, a hydraulic "2 from 3 circuit" is formed, which guarantees that correct closing is ensured in the case of a fault, even in the case of a failure of one of the relief control valves 182, 184, 186 or the relief valves 148 to 158.

In the case of a power failure, the relief control valves 182, 184, 186 are adjusted by the force of their respective switching springs into their basic position, in which the relief flow path in the direction of the switching low-pressure accumulator 134 is opened in a controlled manner, with the result that the pressure medium flows out of the switching pressure space 120 via the three above-described relief paths 142, 144, 146 in order to switch the pressure accumulators, with the result that the switching fitting is switched over by the force of the switching spring 118 into its shut position. This switching operation takes place relatively quickly, it being possible for both the switching fitting 6 and the regulating fitting 4 to be configured in each case with an end position damping means in order to avoid hard switching impacts. According to FIG. 4, the control line 26 is connected via a tapping line 188 to the main line 122, with the result that, when the control switchover valve 112 is open, the pump pressure (high pressure) or the low pressure becomes active correspondingly in the control space of the emergency function valve 104. Correspondingly, in the case of the switching pressure space 120 being relieved of pressure, the emergency function valve 104 is also opened, with the result that the regulating fitting 4 is adjusted in the direction of its closed position independently of the actuation of the fitting valve 80. The temporal sequence of the closing operation of the switching fitting and the regulating fitting can be determined, for example, via the control switchover valve 112.

According to the illustration in FIG. 3, the oil volume within the control line 26 to the regulating drive is practically closed off, since it extends merely as far as the control space of the emergency function valve 104.

The opening sequence can be fixed by suitable design of the above-described control elements, it being possible, for example, for the response behavior to be set by the use of cartridge valves with damping journals, in such a way that the regulating fitting 4 is opened before the switching fitting.

The functional capability of the switching drive according to the disclosure can take place via a partial lift test.

In order to make a partial lift test of this type possible even in the case of the switching drive 18, the outlet connectors B of the relief valves 150, 154, 158 which are arranged upstream (as viewed in the pressure relief direction) are connected to one another via an auxiliary relief path 190, two nozzles 192, 194 and 196, 198 which are connected in series being arranged in each case between adjacent relief valves 150, 154 and 154, 158, respectively, in the auxiliary relief path 190. Said nozzles have a comparatively small opening cross section of, for example, 0.8 mm. Said opening cross section is large enough, however, that clogging of the nozzles by contaminants which are contained in the pressure medium can be prevented. Secondly, the pressure loss via the two nozzles 192, 194 and 196, 198 which are connected behind one another is so great that only a small amount of pressure medium can flow out. For the partial lift test, one of the relief control valves 182, 184, 186 is switched over into its basic position, in which the respective connector A is connected to the tank connector T. If, for example, the relief control valve 182 is moved into its position which is shown in FIG. 4 and the two other relief control valves 184, 186 are switched over into their switching position by energizing of the switching magnets, the control spaces 168 and 174 of the two relief valves 148, 154 are relieved toward low pressure, and the other relief valves 150, 152, 158, 156 remain prestressed in their shut position. As a result of this switchover, pressure medium can then flow out of the switching pressure space 120 via the main line 122, the orifice plate 164, the relief valve 154 which is opened in a controlled manner, the two nozzles 192, 194 of the auxiliary relief path 190, and via the downstream relief valve 148 which is likewise opened in a controlled manner into the outlet line 160 and therefore to the low-pressure accumulator 134. The quantity of pressure medium which flows out is very low on account of the small cross section of the two orifice plates 192, 194, with the result that the pressure in the main line 122 changes only insignificantly. However, this flow of pressure medium is sufficient to move the switching housing 116 by way of the force of the switching spring 118, with the result that the emergency function can be detected and tested. Said partial lift test can also take place in a corresponding way by switching over one of the two other relief control valves 184, 186.

In the variant which is shown, the auxiliary relief path 190 is configured at the upstream relief valves 150, 154, 158. In principle, said auxiliary relief path could also connect the outlet connectors B of the downstream relief valves 148, 152, 156, as indicated by dashed lines at the bottom of FIG. 4.

In the above-described exemplary embodiments, the hydraulic actuating assembly is explained using the example of a switching drive. As mentioned at the outset, the actuating assembly can also be used in a corresponding manner in regulating drives, however.

Figure 5:
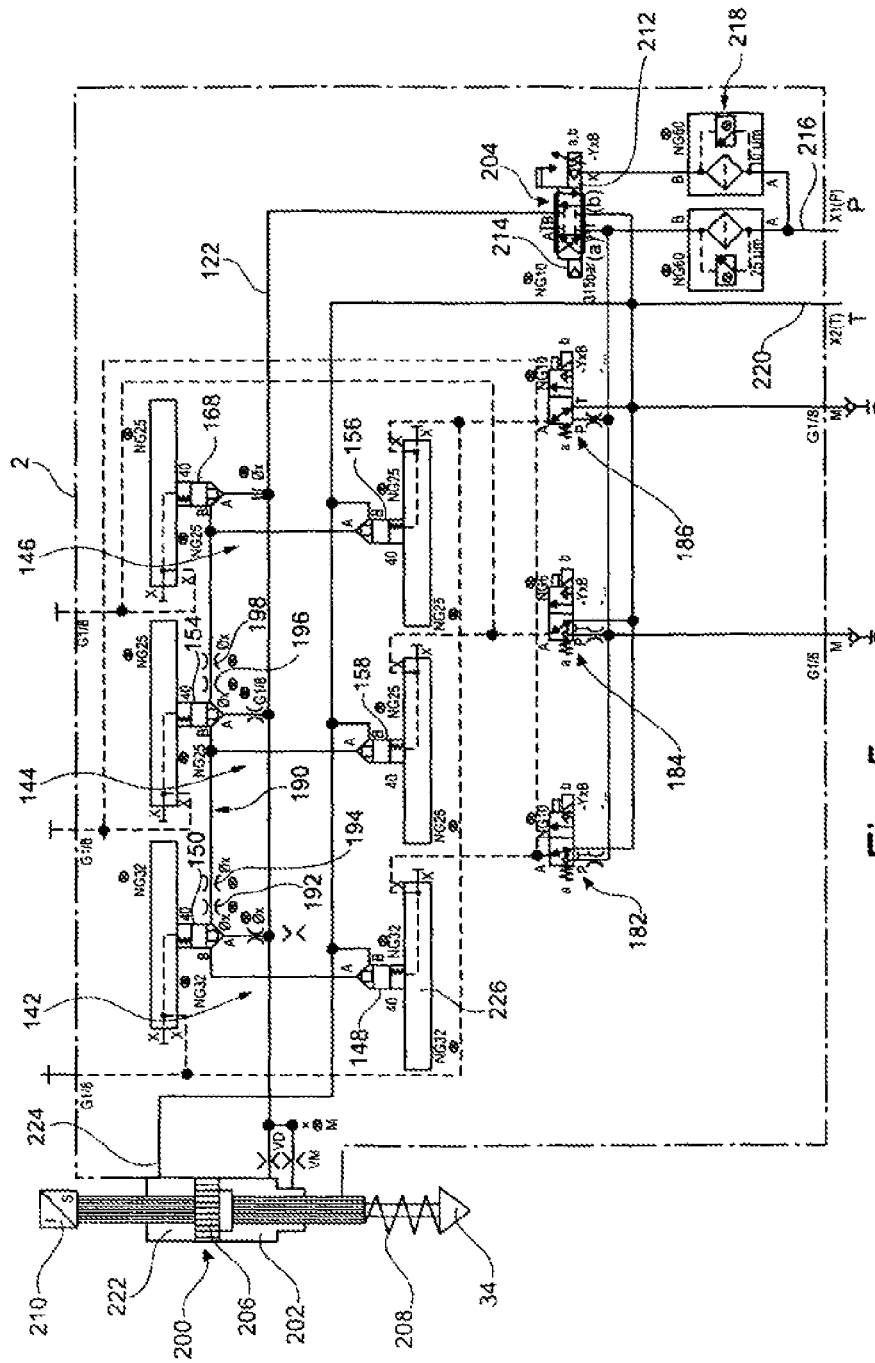
FIG. 5 shows a circuit diagram of an actuating assembly of a regulating fitting.

FIG. 5 shows one exemplary embodiment of a regulating drive having the above-described 2 of 3 circuit and a partial lift test. The solutions which are described in the following text meet the requirements of a 1001D architecture and can also be used in safety circuits, for example, of SIL2 (according to IEC61508 and IEC61511).

In the exemplary embodiment according to FIG. 5, the actuator is configured as what is known as an energy cylinder 200, as is described, for example, in DE 101 52 414 A1. This is a single acting cylinder having a regulating pressure space 202 which acts in the opening direction and in which a pressure can be regulated via a proportionally adjustable regulating valve 204, in order to adjust a regulating piston 206 which is connected to the valve body 34. Said regulating piston 206 is prestressed in the direction of a closed position via a regulating or emergency spring 208. The energy cylinder 200 is configured with a distance measuring system 210, with the result that positional regulation of the valve body 34 is made possible.

The regulating valve 204 can be adjusted from a central shut position via proportional magnets 212, 214. A pressure connector P of the regulating valve 204 is connected to a pressure line 216, in which a filter arrangement 218 is arranged. A tank connector T of the regulating valve 204 is connected to a tank line 220. An outlet connector B of the regulating valve 204 is in a pressure medium connection with a main line which has the same function as the above-described main line 122 and is therefore provided with the same designation. Said main line 122 opens into the regulating pressure space 202. A further pressure space 222 of the energy cylinder 200 is connected via a relief line 224 to the tank line 220. Said tank line 220 can open into an open tank or can also be connected to a low-pressure accumulator (see FIG. 4).

The partial lift test takes place in the same way as in the exemplary embodiment described at the outset, the actuating assembly being of substantially identical construction. For the sake of simplicity, the same designations will therefore be used as in the above-described exemplary embodiment. Accordingly, three relief paths 142, 144, 146 are provided, two relief valves, that is to say the relief valves 148 to 158 in the present case, being provided in each relief path. Furthermore, the auxiliary relief path 190 is realized by way of the orifice plates 192 to 198. The connection of the relief valves also takes place in accordance with the above-described exemplary embodiment, that is to say the inlet connectors A of the relief valves 142, 144, 146 are in a pressure medium connection with the main line 122. Their outlet connectors B are connected to the inlet connectors B of the respectively associated other relief valve 148, 152, 156, and their outlet connectors B open in each case into the tank line 220. As in the above-described exemplary embodiment, the relief valves are configured in each case as a 2-way cartridge valve, the respective control covers 226 being shown in the drawings according to FIGS. 5 and 6; they are not contained in the drawing of FIG. 4. The pressure medium connection to the respectively associated relief control valve 182, 184, 186 takes place via the control covers, via which pressure medium connection the control pressures in the respective control spaces of the relief valves can be set in a controlled manner. That is to say, the control spaces of the respective relief valves 142, 144, 146, 148, 152, 154, 156 can be connected via the relief control valves 182, 184, 186 either to the tank line 220 or else to the main line 122 which is under high pressure; this is also in accordance with the above-described exemplary embodiment, with the result that further explanations can be dispensed with.

In a similar manner to the above-described exemplary embodiment of the switching cylinders 114, the energy cylinder 200 can be relieved in the exemplary embodiment according to FIG. 5 and is then moved into the emergency position (fitting closed) by way of the force of the regulating spring 208.

In the test mode, a small pressure medium flow which can be detected in different ways can flow out via the orifice plates 192, 194, 196, 198.

One possibility consists in adjusting the regulating valve 204 as far as possible into a closed position (basic position according to FIG. 5). Here, the slow extension of the energy cylinder 200 is then detected via the distance measuring system 210 (classic partial lift test).

A further possibility consists in operating the position regulating circuit for the energy cylinder 200 further and holding the position of the valve body 34 via the regulating circuit. An increased regulating error is then detected in said position regulating circuit. Furthermore, correction movements of the energy cylinder 200 during switching into the test mode can likewise be detected in some circumstances and can therefore be evaluated as evidence of correct functioning.

With regard to the further specific construction of the actuating assembly according to FIG. 5, reference is made to the comments with respect to FIG. 4.

Figure 6:
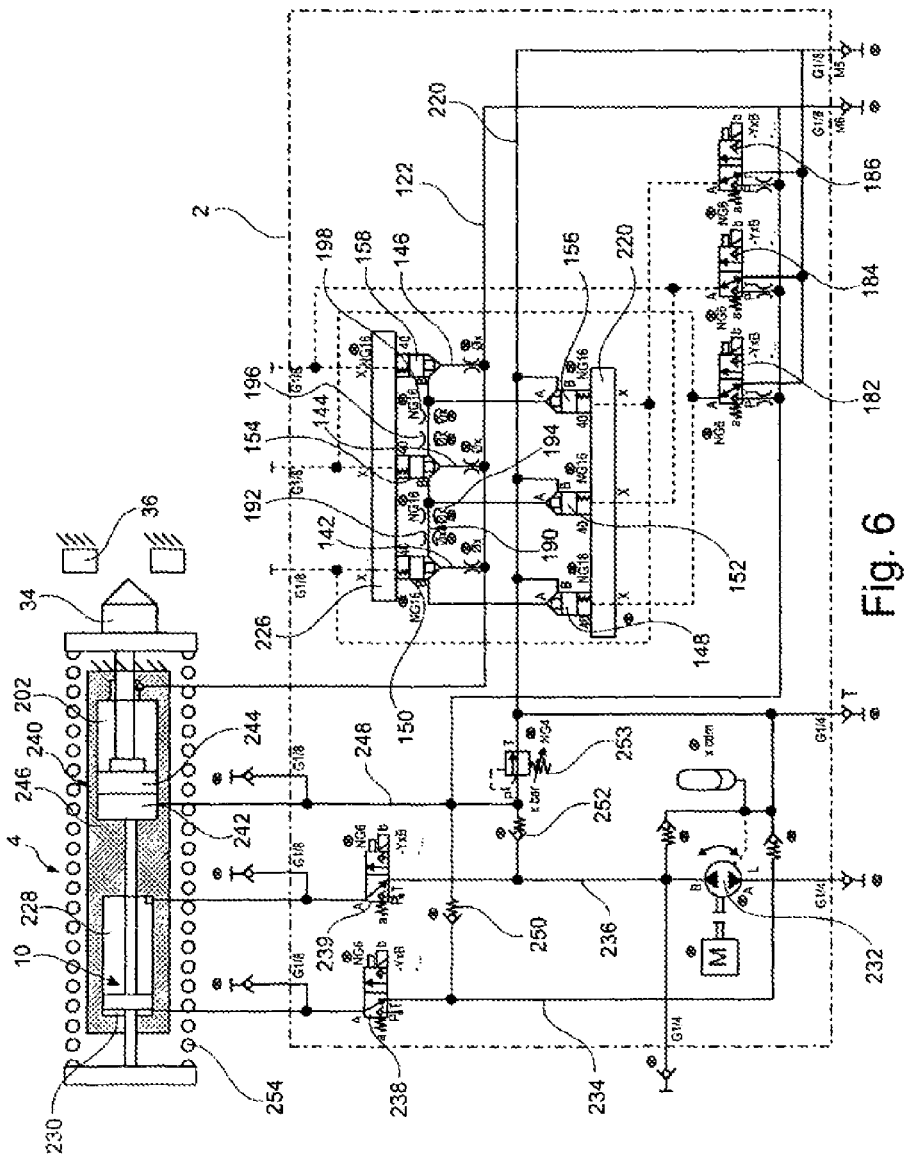
FIG. 6 shows a further exemplary embodiment of an actuating assembly of a regulating fitting having an electrohydraulic drive.

Finally, FIG. 6 shows a variant of the exemplary embodiment according to FIG. 5, in which the actuating assembly is likewise assigned a regulating fitting 4; the latter is configured in accordance with the diagram shown in FIG. 1 and has an electrohydraulic actuating drive with the actuating cylinder 10, the two pressure spaces 228, 230 of which are connected to the connectors A, B of an electrically actuated pump in a closed circuit, a shut-off valve 238, 239 being provided in each pump line 234, 236, which shut-off valve 238, 239 can be adjusted electrically into a shut position. The basic construction of a regulating fitting 4 of this type is explained in the prior patent application DE 10 2010 011 516.9, with the result that further explanations can be dispensed with. Depending on the delivery direction of the pump 232, the actuating cylinder 10 is adjusted in the closing or opening direction of the valve body 34. The actuating cylinder 10 is operatively connected to the valve body 34 via a coupling device 240. Said coupling device 240 is formed by two pistons 242, 244 which are configured separately from one another, the left-hand piston 242 (view according to FIG. 6) being connected to a piston of the actuating cylinder 10, whereas the right-hand piston 244 is connected to the valve body 34. The piston 242 delimits a pressure space 246 (not visible in the illustration according to FIG. 6), whereas the piston 244 delimits a corresponding pressure space in the opening direction of the valve body 34, which pressure space corresponds to the pressure space 202 from FIG. 5. The pressure space 246 which has a minimum volume in the illustration according to FIG. 6 is connected to the pump lines 234, 236 via a branching pressure branch line 248, the high pressure being tapped off by two nonreturn valves 250, 252 which are connected in parallel. The pressure in the pressure branch line 248 and therefore also in the pump lines 234, 236 is limited via a pressure limiting valve 253.

The partial lift test takes place in the same way as in the above-described exemplary embodiments, that is to say the pressure space 202 can be connected via the three relief paths 142, 144, 146 and the auxiliary relief path 190 to the relief valves 148 and the orifice plates 192, 194, 196, 198. In the exemplary embodiment according to FIG. 6, the respective pressure-side relief valves 150, 154, 158 and the low-pressure-side relief valves 148, 152, 156 are in each case assigned a common control cover 226. As in the above-described exemplary embodiment, the inlet connectors A of the relief valves 142, 144, 146 are connected to the main line 122 which opens into the pressure space 202. The outlet connectors B of said relief valves are connected to the inlet connectors A of the respectively associated low-pressure-side relief valves 148, 152, 156, the outlet connectors B of which open into the tank line 220.

The adjustment of the valve body 34 in the emergency function takes place via the emergency spring 254, the function of which corresponds to the regulating spring 208 in the exemplary embodiment according to FIG. 5.

The actuation of the relief valves 148 to 158 takes place once again via a relief control valve 182, 184, 186 which is assigned to in each case one relief path 142, 144, 146.

A hydraulic actuating assembly is disclosed for fittings for controlling process fluid flows having a fitting which is actuated by an actuator and is prestressed in the direction of a closed position. The actuator has a pressure space which acts in the opening direction and can be connected to low pressure via three parallel relief paths. According to the disclosure, an auxiliary relief path is provided which can be opened in a controlled manner in the test mode.

LIST OF DESIGNATIONS

1 Steam turbine
2 Actuating assembly
4 Regulating fitting
6 Switching fitting
8 Regulating drive
10 Actuating cylinder
12 Emergency actuating means
16 Damping device
18 Switching drive
20 Spring-force accumulator
21 Steam line
22 Switching piston
24 Pressure space
26 Control line
28 Cylinder
30 Fitting piston
32 Stressing piston
34 Valve body
36 Seat
38 Piston collar
40 Piston collar
42 Pressure space
44 Pressure space
46 Intermediate floor
48 Cylinder journal
50 Stressing space
52 Stressing space
54 Stressing line
56 Stressing line
58 Stressing valve
60 Stressing valve
62 Low pressure line
64 Inlet line
66 Hydraulic machine
68 Electric motor
70 Low pressure accumulator
72 Replenishing valve
73 Nonreturn valve
74 Pressure line
76 Nonreturn valve
78 Relief line
80 Fitting valve
81 Accumulator channel
82 Channel
84 Replenishing valve
86 Shut-off valve
88 Bypass channel
90 Nozzle
92 Pressure limiting channel
94 Pressure limiting valve
96 Control channel
98 Bypass valve
100 Control channel
102 Control channel
104 Emergency function valve
106 Low pressure channel
108 Nozzle
110 Line
112 Control switchover valve
114 Switching cylinder
116 Switching housing
118 Switching spring
120 Switching pressure space
122 Main line
124 Supply line
126 Nonreturn valve
128 Nonreturn valve
130 Switching pump
132 Suction line
134 Switching low pressure accumulator
136 Low pressure valve
138 Tank line
140 Pressure limiting valve
142 Relief path
144 Relief path
146 Relief path
148 Relief valve
150 Relief valve
152 Relief valve
154 Relief valve
156 Relief valve
158 Relief valve
160 Outlet line
162 Orifice plate
164 Orifice plate
166 Orifice plate
168 Control space
170 Control space
172 Control space
174 Control space
176 Control space
180 Control space
182 Relief control valve
184 Relief control valve
186 Relief control valve
188 Tapping line
190 Auxiliary relief path
192 Orifice plate
194 Orifice plate
196 Orifice plate
198 Orifice plate
200 Energy cylinder
202 Regulating pressure space
204 Regulating valve
206 Regulating piston
208 Regulating spring
210 Distance measuring system
212 Proportional magnet
214 Proportional magnet
216 Pressure line
218 Filter arrangement
220 Tank line
222 Outlet line
224 Relief line
226 Control cover
228 Pressure space
230 Pressure space
232 Pump
234 Pump line
236 Pump line
238 Shut-off valve
239 Shut-off valve
240 Coupling device
242 Piston
244 Piston
246 Pressure space
248 Pressure branch line
250 Nonreturn valve
252 Nonreturn valve 253 Pressure limiting valve
254 Emergency spring The invention clamed is:

1. A hydraulic actuating assembly for fittings for controlling process fluid flows, comprising:
   an actuator which is prestressed in a closed direction toward a closed position via an energy store, the actuator having a pressure space which acts in an opening direction of a fitting, is loaded via a main line with an opening pressure counter to a direction of action of the energy store, and is connected to low pressure via three parallel relief paths, each of the relief paths including one upstream relief valve and one downstream relief valve arranged in series, and each of the upstream relief valves and the downstream relief valves being configured to be adjusted from a shut position into a relief position in order to close the fitting;
   an auxiliary relief path extending between output connectors of one of the upstream relief valves and the downstream relief valves;
   at least one orifice plate with a small opening cross section positioned in the auxiliary relief path between each pair of adjacent relief valves of the one of the upstream relief valves and the downstream relief valves; and
   an actuating circuit configured, in a test mode, to adjust the upstream relief valve in one relief path of the three relief paths and the downstream relief valve in another relief path of the three relief paths into the relief position.

2. The actuating assembly as claimed in claim 1, wherein at least two orifice plates are connected behind one another.

3. The actuating assembly as claimed in claim 1, wherein a switching control pressure loads the upstream relief valve in a first relief path of the three relief paths and the downstream relief valve a second relief path of the three relief paths for switching over.

4. The actuating assembly as claimed in claim 1, wherein the actuator is a switching drive of a switching fitting.

5. The actuating assembly as claimed in claim 4, further comprising:
   a regulating fitting arranged in series with the switching fitting and configured to be adjusted via a regulating drive; and
   an emergency function valve,
   wherein the regulating fitting includes an emergency actuating mechanism which resets the regulating fitting into a basic position in response to a fault,
   wherein said emergency actuating means is triggered by switching over of an electrically actuated fitting valve, and
   wherein the emergency function valve is switched over by a control pressure to trigger the emergency actuating mechanism.

6. The actuating assembly as claimed in claim 5, wherein the control pressure is tapped off via a control line at the switching drive.

7. The actuating assembly as claimed in claim 6, further comprising:
   a control switchover valve arranged in the control line connecting a control space of the emergency function valve to the main line of the switching drive,
   wherein the control switchover valve is prestressed in a passage direction toward a passage position and is configured to be switched over in a shut direction toward a leak-free shut position.

8. The actuating assembly as claimed in claim 5, wherein at least one of the relief valves and the emergency function valve is configured as a logic valve.

9. The actuating assembly as claimed in claim 1, wherein the actuator is a cylinder of a regulating drive.

10. The actuating assembly as claimed in claim 9, wherein the actuating circuit includes a regulating valve configured to set a pressure in the pressure space.

11. The actuating assembly as claimed in claim 9, wherein the cylinder is position-controlled.

12. The actuating assembly as claimed in claim 9, wherein the cylinder is part of a coupling device of an emergency actuating mechanism and the coupling device is operatively connected to a regulating drive.

13. The actuating assembly as claimed in claim 1, wherein the upstream relief valve and the downstream relief valve in a first relief path of the three relief paths have a greater nominal size than the upstream relief valve and the downstream relief valve in at least one of the other relief paths.

14. The actuating assembly as claimed in claim 1, wherein the energy store includes at least one spring.

* * * * *